United States Patent
Metzger et al.

(10) Patent No.: US 8,728,192 B2
(45) Date of Patent: May 20, 2014

(54) FILTER HOUSING WITH REPLACEABLE LATCHING ELEMENT HAVING PRE-DETERMINED BREAKING POINT

(75) Inventors: Michael Metzger, Waiblingen (DE); Bernd Joos, Lorch (DE); Ettore Nocera, Besigheim (DE); Thomas Jessberger, Asperg (DE); Alexander Seifert, Munich (DE); Stefan Walz, Freiberg a. N. (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/429,355

(22) Filed: Mar. 24, 2012

(65) Prior Publication Data

US 2012/0240540 A1    Sep. 27, 2012

(30) Foreign Application Priority Data

Mar. 24, 2011  (DE) .......................... 10 2011 015 062

(51) Int. Cl.
| | |
|---|---|
| *B01D 39/00* | (2006.01) |
| *B01D 46/00* | (2006.01) |
| *B01D 47/00* | (2006.01) |
| *B01D 53/00* | (2006.01) |
| *B01D 39/06* | (2006.01) |
| *B01D 59/50* | (2006.01) |
| *B01D 50/00* | (2006.01) |
| *F01N 3/00* | (2006.01) |

(52) U.S. Cl.
USPC ............. 55/493; 55/523; 55/385.1; 55/385.3; 55/502; 60/297

(58) Field of Classification Search
USPC .......... 55/493, 423, 385.1, 384.3, 502, 385.3; 60/297
See application file for complete search history.

(56) References Cited

U.S. PATENT DOCUMENTS

| | | | | |
|---|---|---|---|---|
| 4,127,221 | A | * | 11/1978 | Vere .......................... 222/153.02 |
| 4,925,469 | A | * | 5/1990 | Clement et al. .................. 55/480 |
| 5,147,054 | A | * | 9/1992 | Pehr ............................... 215/253 |
| 5,193,706 | A | * | 3/1993 | Hanna et al. ................... 220/324 |
| 5,213,596 | A | * | 5/1993 | Kume et al. ...................... 55/481 |
| 5,295,602 | A | * | 3/1994 | Swanson ....................... 220/786 |
| 5,405,007 | A | * | 4/1995 | Iwahashi .................... 206/387.1 |
| 5,649,646 | A | * | 7/1997 | Foster et al. ............. 222/153.14 |
| 5,725,624 | A | * | 3/1998 | Ernst et al. ....................... 55/502 |
| 5,810,188 | A | * | 9/1998 | Novakoski et al. ........ 220/254.3 |
| 6,231,630 | B1 | * | 5/2001 | Ernst et al. .................... 55/385.3 |
| 6,290,739 | B1 | * | 9/2001 | Gieseke et al. ................. 55/330 |
| 6,306,192 | B1 | * | 10/2001 | Greif et al. ...................... 55/498 |
| 6,383,268 | B2 | * | 5/2002 | Oda ................................ 96/134 |
| 6,598,580 | B2 | * | 7/2003 | Baumann et al. ......... 123/198 E |

(Continued)

*Primary Examiner* — Amber Orlando
(74) *Attorney, Agent, or Firm* — James Hasselbeck

(57) ABSTRACT

A filter housing has first and second housing parts connected to each other to be openable and secured by a latching element. The latching element is connected to the first housing part by a moveable connection with a predetermined breaking point and is pivotable by the movable connection into the closed state. The latching element has two positioning elements and the housing parts have counter positioning elements. In the closed state, the counter positioning elements are axially arranged between the two positioning elements and the positioning elements form a stop for the counter positioning elements. The latching element has an element locking section locking at a housing locking section on the first or second housing part. The predetermined breaking point is subjected to mechanical stress such that the predetermined breaking point breaks upon locking or release of the latching element.

7 Claims, 4 Drawing Sheets

(56) References Cited

U.S. PATENT DOCUMENTS

| | | | |
|---|---|---|---|
| 6,780,217 B1* | 8/2004 | Palmer | 55/502 |
| 7,077,893 B2* | 7/2006 | Guilliard | 96/414 |
| 7,147,685 B2* | 12/2006 | Lee | 55/467 |
| 7,294,161 B2* | 11/2007 | Connor et al. | 55/498 |
| 7,413,083 B2* | 8/2008 | Belfance et al. | 206/540 |
| 7,850,756 B1 | 12/2010 | Senetar, III | |
| 7,900,316 B2* | 3/2011 | Fester et al. | 15/327.2 |
| 8,182,570 B2* | 5/2012 | Rieger | 55/502 |
| 8,298,308 B2* | 10/2012 | Li | 55/385.3 |
| 2008/0035103 A1* | 2/2008 | Barris et al. | 123/198 E |
| 2010/0043367 A1* | 2/2010 | Desjardins | 55/493 |
| 2010/0096315 A1 | 4/2010 | Gillenberg et al. | |
| 2012/0192535 A1* | 8/2012 | Schrewe | 55/385.3 |

* cited by examiner

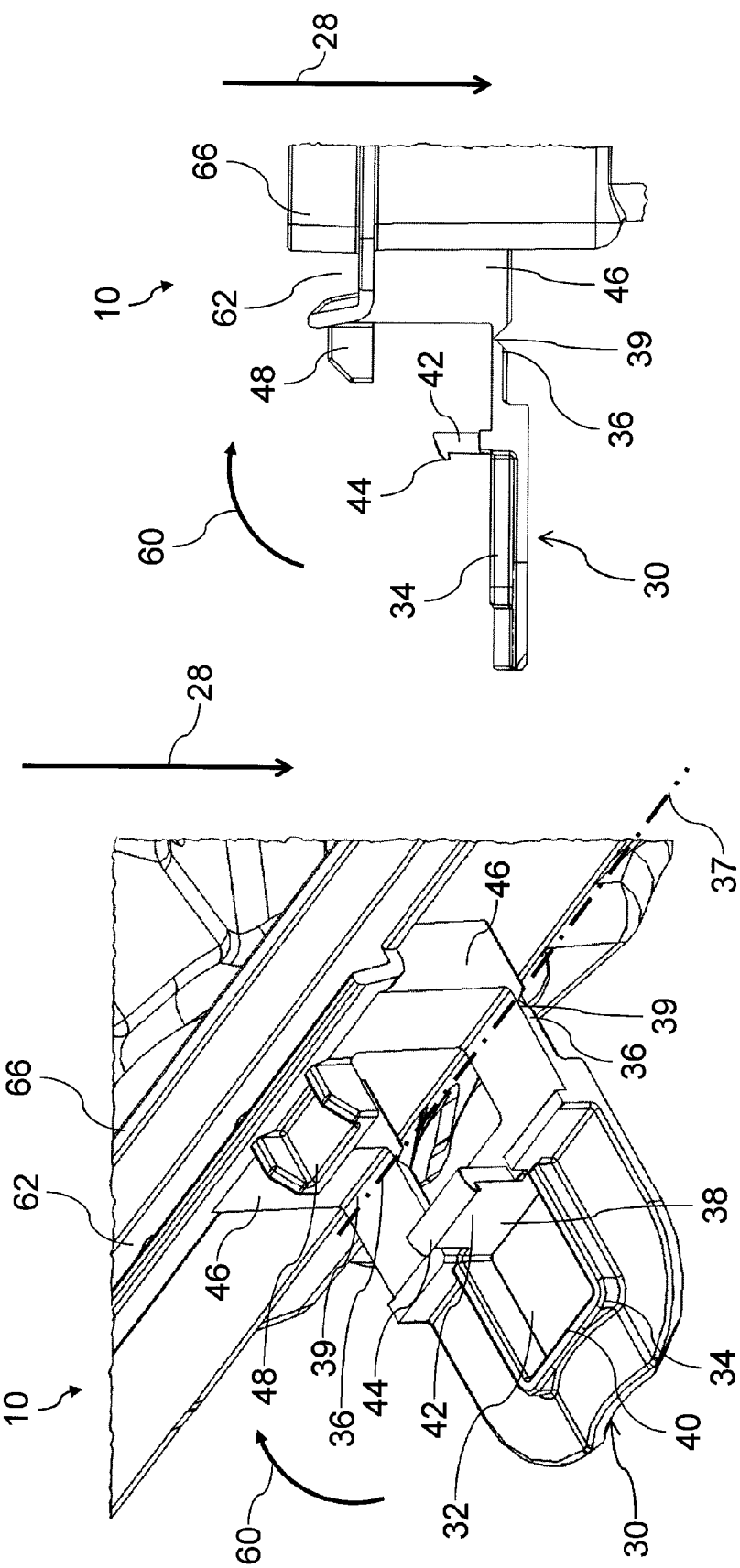

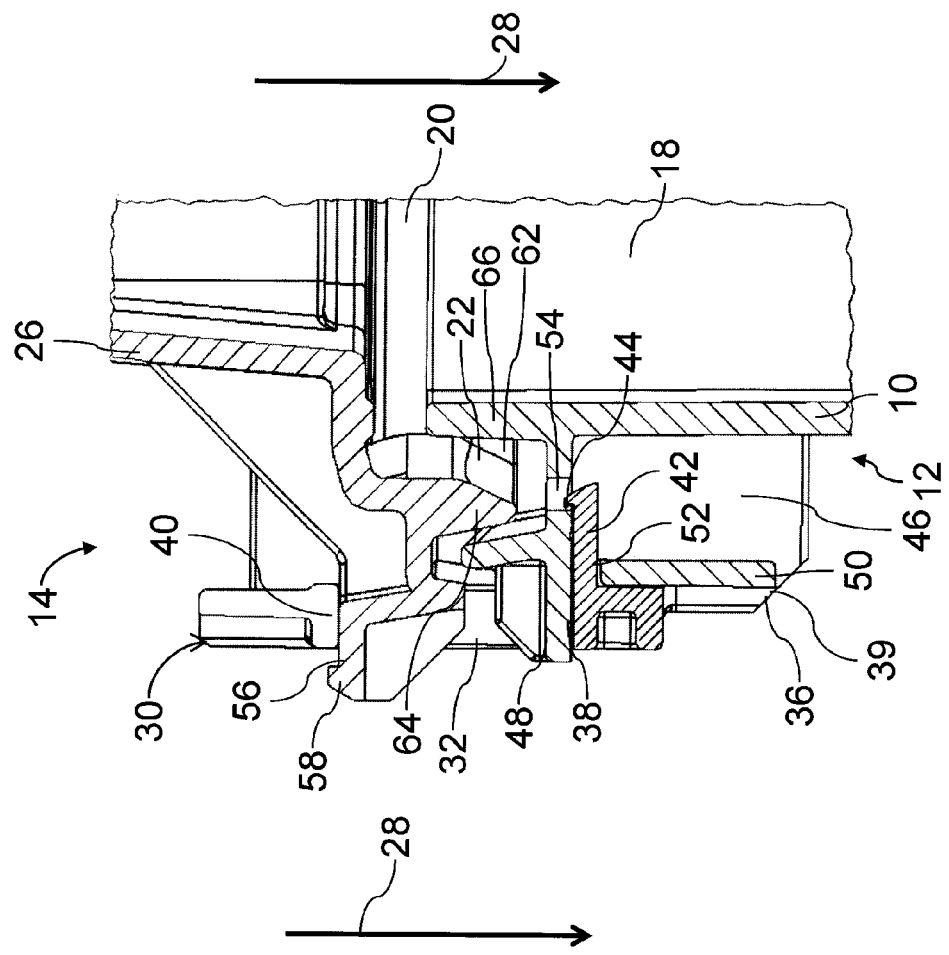
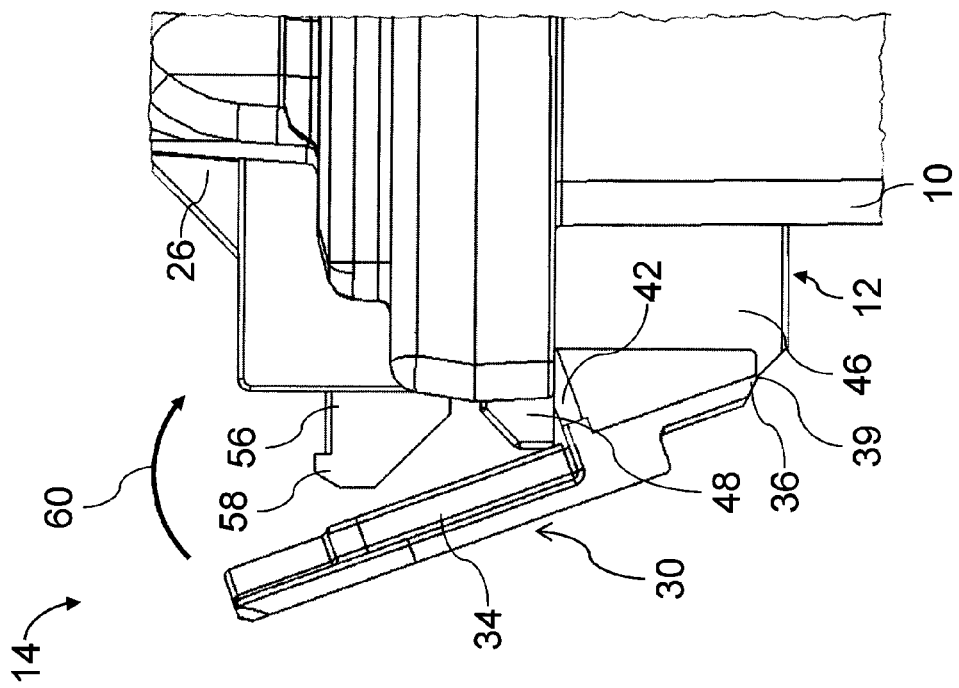

FILTER HOUSING WITH REPLACEABLE LATCHING ELEMENT HAVING PRE-DETERMINED BREAKING POINT

CROSS REFERENCE TO RELATED APPLICATIONS

The present application claims priority from German patent application no. 10 2011 015 062.5 filed on Mar. 24, 2011, all of the contents of which are incorporated herein by reference and to the fullest extent of the law.

TECHNICAL FIELD

This disclosure relates generally to a filter housing of an air filter for an internal combustion engine with a latching element having a predetermined breaking point.

BACKGROUND OF THE INVENTION

The invention concerns a filter housing of an air filter, in particular of an internal combustion engine, in particular of a motor vehicle, comprising at least two housing parts that are connected to each other so that they can be opened or released from each other. The filter housing comprises a raw air (unfiltered air) inlet and a clean air (filtered air) outlet. In the filter housing a filter element is arranged in such a way that the raw air inlet is seal-tightly separated from the clean air outlet. The filter housing comprises at least one latching element for holding together the two housing parts, which latching element is connected at least up to the point of first assembly of the two housing parts by a movable connection on a first one of the housing parts, wherein the latching element can be pivoted by means of the movable connection for latching the housing parts. The latching element has at least two positioning elements and each one of the housing parts has a counter-positioning element, respectively. In the closed state of the latching element, the counter positioning elements are arranged between the two positioning elements axially relative to an assembly direction of the two housing parts. The positioning elements each form a stop for the respective counter-positioning element in axial direction.

Moreover, the invention concerns a latching element of a filter housing of an air filter, in particular of an internal combustion engine, in particular of a motor vehicle, for holding together two housing parts of the filter housing that are connectable to each other so that they can be opened or released from each other. The filter housing is configured to have a raw air inlet and a clean air outlet and a filter element is arranged in the filter housing in such a way that the raw air inlet is seal-tightly separated from the clean air outlet. The latching element has at least two positioning elements and each one of the housing parts has a counter-positioning element, respectively, to be positioned between the two positioning elements in the closed state of the latching element, axially relative to an assembly direction of the two housing parts. The positioning elements can form a stop for the corresponding counter positioning element in axial direction.

WO98/30798 A1 discloses a filter, in particular an air filter for motor vehicles that comprises a housing with a raw air inlet and a clean air outlet. In the housing there is a filter insert that separates the raw air inlet from the clean air outlet. The housing is comprised substantially of two housing parts that are held together by a latching element. The housing parts can be opened and closed in particular in order to insert or remove a filter insert. The latching element is attached by means of a toggle element and two film hinges on one of the housing parts. Moreover, the latching element has positioning elements that define a closing connection of the two housing parts and ensure that housing sealing surfaces are precisely positioned on each other so that the connection of the housing sealing surfaces allows no air leaks. For closing the latching element, it is required to perform by means of the toggle element a complex pivot movement with the two film hinges.

U.S. Pat. No. 7,850,756 B1 discloses a latching mechanism for a filter housing that, because of its special configuration, is not damaged when loaded excessively and also prevents damage to the housing.

DE 93 05 767 U1 discloses an air filter with a housing on which by means of film hinges holders are arranged that secure the filter element in its mounted position.

DE 10 2005 010 443 A1 discloses a filter element that is surrounded by a jacket element on its circumference, wherein on the jacket element contours for attachment of the filter element in a filter housing are arranged.

DE 10 2007 057 380 A1 concerns a filter with an exchangeable filter insert, a filter housing that receives the filter insert, and a lid that is connected by means of positive-locking connection on the filter housing.

DE 43 43 814 A1 discloses an air filter in which near the transverse wall at the head of the housing a bracket engages a fold of the filter insert and an L-shaped holding-down element covers a certain area of the filter insert.

WO 08/102011 A1 discloses a further embodiment of a fluid filter in which mounting aids on the filter element have correlated therewith mounting aids on the housing and, in the assembled position, the mounting aids engage each other.

DE 10 2010 027 995 A1, published after the priority date of the instant application, discloses a sensor element that is attached by a non-detachable connection to a flexible support.

SUMMARY OF THE INVENTION

It is an object of the present invention to design a filter housing and a latching element of a filter housing such that they can be produced in a simple way and that they enable in a simple way a reliable sealing action between the two housing parts, in particular, with respect to air leaks. Moreover, it should be possible that the use of a wrong filter element or a filter element that does not fit is indicated in a simple way.

In accordance with the present invention, this is achieved in that the movable connection has a predetermined breaking point and the latching element has at least one element locking section that, in the closed state of the latching element, locks at a housing locking section on one of the housing parts, wherein the predetermined breaking point upon locking and/or upon release of the locking action is subjected to such mechanical tension that at least upon re-opening of the latching element the predetermined breaking point will break.

According to the invention, it is thus provided that the movable connection of the latching element with the housing part will be separated at the predetermined breaking point at least at the time of opening the latching element. Preferably, the predetermined breaking point should break at the time of opening the latching element. In this way, it is indicated in a simple way that the filter housing, after initial assembly, has been opened and is no longer in its original state. This can be an indication that the filter element may have been exchanged. When it is provided that the predetermined breaking point already breaks upon closure of the latching element, the broken predetermined breaking point indicates that the housing part provided with the latching element is not a new part. In this way, it can be prevented that the housing part can be used again as an original part of the air filter without recognizing it, in particular when used as an exchangeable part. The use of a used housing part instead of an original part could cause technical problems, in particular reduced filter efficiency and/or seal-tightness of the filter housing, in particular in regard to air leaks.

Advantageously, it can be provided that the latching element upon opening is at least partially destroyed so that, in order to close the air filter housing again, an appropriate replacement latching element must be used. The air filter housing cannot be closed again without a matching replacement latching element. Such a replacement latching element can preferably be furnished together with a new filter element. In this way, it can be prevented that a wrong filter element is used that does not come with the proper replacement latching element.

Foregoing the reusability of the latching element has the advantage that the movable connection as a whole can be designed to be more stable than would be the case in connection with reusable latching elements. In particular, reusable latching elements are subjected to wear in connection with each opening and closing process. They may become loose and/or the locking action may become worn or break off.

The element locking section on the latching element locks in the closed state of the latching element on an appropriate housing locking section on one of the housing parts. With this locking connection the latching element is secured safely on the filter housing so that, in operation of the air filter, it holds together reliably the two counter positioning elements and thus the housing parts.

Moreover, the locking connection has the effect that the predetermined breaking point upon locking action is subjected to mechanical stress. The mechanical stress has the effect that the predetermined breaking point will break at the latest upon opening of the closure element.

The movable connection has preferably only one pivot axis. This has the advantage that the latching element can be moved into the closed state by means of a simple pivot movement. This can be done also in an automated fashion with a simple assembly device. Since the latching element before first assembly is attached to the first housing part, assembly is simplified. A separate assembly step in which the latching element must be first positioned on the housing part is eliminated.

The movable connection can advantageously be a film hinge on which in a simple way the predetermined breaking point can be realized. The latching element can be simply injection molded on the corresponding housing part. The latching element and the housing part can be made of the same material. They can form a monolithic part.

The latching element and the housing part can also be made of different materials. The latching element can then be connected by injection molding with an appropriate movable connection, in particular of plastic material, on the housing part.

The element locking section and/or the housing locking section can preferably be provided with a predetermined breaking point that upon opening of the latching element automatically breaks so that reuse of the latching element is prevented.

Moreover, on the latching element or on the housing part a guide can be provided that interacts with the element locking section and the housing locking section and in this way prevents that the locking connection, when opening the latching element, can be released without being destroyed.

The assembly of the two housing parts must not be realized completely straight in the assembly direction. The assembly can be particularly realized also with a pivot movement wherein the end phase of the assembly process is realized in the assembly direction.

In another advantageous embodiment, the latching element can have a positioning opening wherein oppositely positioned boundary walls of the positioning opening form the two positioning elements and the counter positioning elements can be projections on the corresponding housing parts that, in the closed state of the latching element, project into the positioning opening and rest against the positioning elements.

The latching element as a whole can preferably be approximately of a ring shape. Preferably, the positioning opening can be approximately rectangular. However, it can also be round or oval. The positioning opening serves for receiving the counter positioning elements. When the counter positioning elements are inserted into the positioning opening, the oppositely positioned positioning elements serve as stops and prevent that the counter positioning elements and thus the housing parts are moved in axial direction farther away from each other than provided for by the spacing of the positioning elements. In this way, the maximally possible distance between the housing parts in the closed state of the latching element can be predetermined in a simple way.

When using an axial seal for sealing the housing sealing surface of the housing parts, it is possible to achieve an axial compression of the axial seal by means of the latching element through the action of the counter positioning elements so that the sealing function can be improved. The counter positioning elements can be arranged such that they rest on each other in the closed state of the latching element. However, they can also be arranged such that they are spaced apart in axial direction in the closed state of the latching element.

Advantageously, at least one of the positioning elements can be provided with one of the element locking sections and the corresponding counter positioning element can be provided with the corresponding housing locking section. In this way, the stop function and a locking function can be combined in a simple way. In this way, the mounting expenditure and/or the component expenditure can be reduced.

Moreover, advantageously, the latching element can have at least one element guide section, in particular a guide pin, and at least one of the housing parts can have a corresponding housing guide section, in particular with a guide slot, for guiding the latching element during the closing movement into the closed state. By interaction of the element guide section with the housing guide section, the latching element can be guided in a simple way when pivoted into the closed state. The positional precision of the housing parts and of the latching element in the closed state can thereby be improved in a simple way. By the guiding action, the mechanical stress on the predetermined breaking point can be increased also.

Moreover, advantageously, the element guide section can be provided with an element locking section and the housing guide section can be provided with a corresponding housing locking section. In this way, the stability of the fixation of the latching element in the closed state can be improved. Moreover, the mechanical stress on the predetermined breaking point can be further increased.

Advantageously, the element locking section can be provided with a predetermined breaking point that breaks upon separation of the element guide section from the housing guide section. In this way, it can be prevented in a simple way that the latching element is used several times. In this way, wear of the latching element can be prevented that could be caused by using the latching element several times and that may impair a reliable action of the latching action.

The object is further solved according to the invention by the latching element in that it comprises at least one element locking section that, in the closed state of the latching element, can lock with a housing locking section on one of the housing parts. The features and advantages that have been mentioned above in connection with the inventive filter housing apply also to the latching element according to the invention and its advantageous embodiments.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Further advantages, features and details of the invention result from the following description in which embodiments of the invention will be explained in detail with the aid of the drawing. A person of skill in the art will also consider individually the features disclosed in combination in the drawing, the descriptions and the claims and will combine them to other expedient combinations.

FIG. 2 shows an isometric detail view of one of the latching elements of the housing bottom part of FIG. 1;

FIG. 3 is a side view of the latching element of FIG. 2;

FIG. 4 is a side view of a detail of the air filter housing in which a housing cover is arranged on a housing bottom part, wherein the latching element of FIGS. 1 to 3 is illustrated in a phase of the pivot movement into its closed state;

FIG. 5 is a section of the detail of the air filter housing of FIG. 4 with a filter element wherein the latching element is in its closed state.

In the Figures, same components are identified with the same reference characters.

Figure 1:
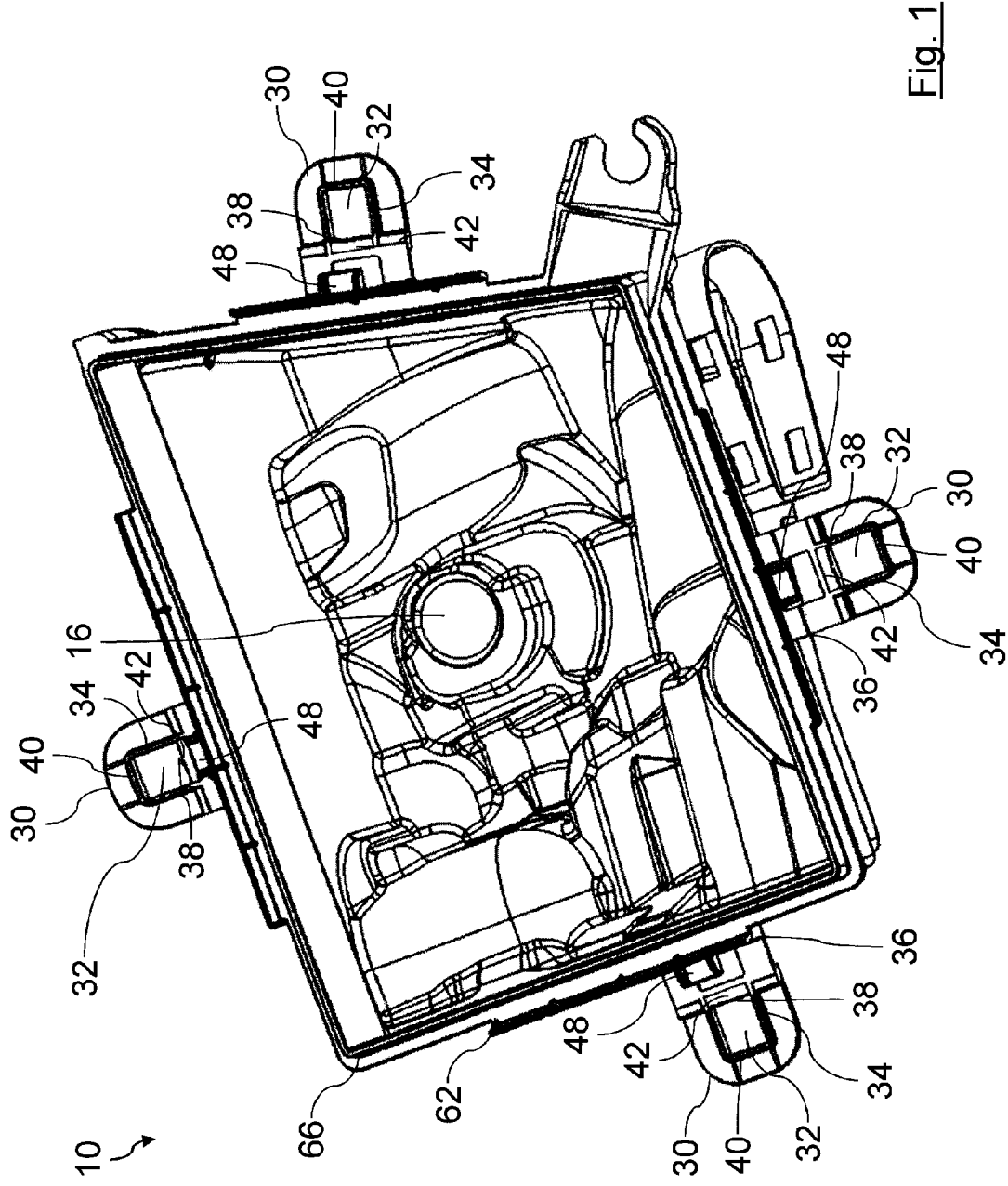
FIG. 1 shows a plan view of a housing bottom part of an open air filter housing of an internal combustion engine with latching elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an air filter housing with latching element(s). Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a plan view of a housing bottom part 10 of an air filter housing 12 of an air filter 14 that is illustrated in FIGS. 4 and 5 in a detail view, respectively. The air filter 14 is used for filtration of combustion air of an internal combustion engine of a motor vehicle.

The housing bottom part 10 is made of plastic material. At the bottom of the housing bottom part 10 a clean air outlet 16 for filtered combustion air is arranged. In the housing bottom part 10 a flat filter element 18 can be arranged, as indicated in FIG. 5. The filter element 18 has a sealing element 20 that is provided with a sealing tongue 22 and that is acting radially relative to the assembly direction 28. The sealing element 20 is arranged between the housing bottom part 10 and a housing cover 26 of the air filter housing 12. The housing cover 26 is mounted on the housing bottom part 10 in assembly direction 28 and can be opened. The filter element 18 separates the clean air outlet 16 seal-tightly from a raw air inlet for the combustion air to be filtered that is provided in the housing cover 26 and not illustrated here.

On the four exterior sides of the housing bottom part 10 that is approximately trapezoidal in plan view, a latching element 30 is arranged, respectively. The latching elements 30 are made of plastic material. The housing bottom part 10 and the latching elements 30 are monolithically formed. One of the closure elements 30 is illustrated in FIGS. 2 to 5 in different positions in detail. The latching element 30 comprises a substantially flat, approximately parallelepipedal body that, for reinforcement, is stepped at some places and provided with reinforcement projections. The latching element 30 comprises a substantially rectangular positioning opening 32, which is surrounded by a reinforcement rim 34.

On its side that is facing the housing bottom part 10, the latching element 30 has two legs. The legs are connected by means of film hinges 36 to respective projections 46 on the exterior wall of the housing bottom part 10 and pivotable about a common pivot axis 37, indicated in FIG. 2. Along the pivot axis 37 the film hinges 36 have a predetermined breaking point 39. In the original state of the housing bottom part 10 before first assembly of the air filter housing 12, the latching element 30 extends outwardly away from the housing bottom part 10 perpendicularly to the assembly direction 28.

Two oppositely positioned sidewalls of the positioning opening 32 that each extend parallel to the pivot axis 37 form a lower positioning element 38 and an upper positioning element 40.

In the original state of the housing bottom part 10 illustrated in FIGS. 2 and 3, a parallelepipedal flat guide pin 42 extends perpendicularly to the latching element 30 in the direction opposite to the assembly direction 28. The contours of the surface of the lower positioning element 38 facing the upper positioning element 40 and the side of the guide pin 42 facing away from the film hinges 36 pass into each other.

At its free end, the guide pin 42 has a locking web 44 on the side that is facing away from the film hinges 36. The locking web 44 extends parallel to the pivot axis 37 across the entire width of the guide pin 42. The locking web 44 is hook-shaped in the direction toward the positioning opening 32.

On the exterior side of the housing bottom part 10 a lower counter-positioning element 48 is arranged. The lower counter-positioning element 48 has an approximately U-shaped profile. The open side of the profile faces in the direction of the open side of the housing bottom part 10, i.e., faces away from the pivot axis 37. The upper counter-positioning element 48 extends perpendicularly to the assembly direction 28. It is located, viewed axially relative to the assembly direction 28, between the sealing surface 22 of the housing bottom part and the film hinges 36. The spacing between the pivot axis 37 and a bottom side of the upper counter positioning element 48 that is facing the film hinges 36 corresponds approximately to the spacing between the pivot axis 37 and the surface of the lower positioning element 38 that is facing the upper positioning element 40.

The free corners of the sidewalls of the lower counter-positioning element 48 on the side facing away from the film hinges 36 are beveled. The extension of the lower counter-positioning element 48 parallel to the pivot axis 37 is approximately as large as the corresponding extension of the positioning opening 32. The oppositely positioned exterior sides of the sidewalls of the lower counter positioning element 48 are positioned in a common plane with the inner walls of the latching element 30 that are facing each other and delimit the positioning opening 32, respectively; this common plane is perpendicular to the pivot axis 37. In the closed state of the latching element 30 illustrated in FIG. 5, the surface of the lower positioning element 38 is resting flat on the bottom side of the lower counter-positioning element 48 that is facing the film hinges 36.

On the side of the lower counter-positioning element 48 that is facing the film hinges 36, a housing guide section 50 is arranged between the projections 46 on the exterior side of the housing bottom part 10. The housing guide section 50 is illustrated in FIG. 5. The housing guide section 50, together with the bottom side of the lower counter-positioning element 48 facing the film hinges 36, delimits a guide slot 52. The guide slot 52 forms a guide for the guide pin 42 when pivoting the latching element 30 into the closed state.

A locking groove 54 is arranged on the side that is facing the free end of the lower counter-positioning element 48 on an extension of the bottom side of the lower counter-positioning element 48 that is facing the film hinges 36. The locking groove 54 extends parallel to the pivot axis 37. In the closed state of the latching element 30, the locking web 44 of the guide pin 42 locks in the locking groove 54.

On the exterior side of the housing cover 26, as illustrated in FIGS. 4 and 5, an upper counter-positioning element 56 is arranged. When the housing cover 26 is mounted, each one of the upper counter positioning elements 56 is aligned, viewed axially in the assembly direction 28, with the corresponding lower counter-positioning element 48. Each upper counter positioning element 56 has an approximately U-shaped profile whose open side, when the housing cover 26, is mounted, faces the corresponding lower counter positioning element 48. The free corners of the sidewalls of the upper counter-positioning element 56 are beveled. When the housing cover 28 is mounted, a topside of the upper counter positioning element 56 that is facing away from the counter positioning element 48 extends parallel to the bottom side of the lower counter positioning element 48. The length of the upper counter-positioning element 56 parallel to the pivot axis 37 matches the corresponding length of the lower counter-positioning element 48. When the housing cover 26 is mounted, illustrated in FIGS. 4 and 5, the spacing between the bottom side of the lower counter-positioning element 48 and the topside of the upper counter-positioning element 56, viewed axially in the assembly direction 28, corresponds approximately to the spacing between the surface of the lower positioning element 38 facing the upper positioning element 40 and the surface of the upper positioning element 40 of the latching element 30 that is facing away from the lower positioning element 38.

In the closed state of the latching element 30, illustrated in FIG. 5, the lower counter positioning element 48 and the upper counter positioning element 56, viewed axially in the assembly direction 28, are positioned between the lower positioning element 38 and the upper positioning element 40. The lower positioning element 38 forms in this way a stop for the lower counter-positioning element 48. The upper positioning element 40 forms accordingly a stop for the upper counter-positioning element 56. The stops prevent that the housing cover 26 can move farther away from the housing bottom part 10 than provided for by the spacing between the lower positioning element 38 and the upper positioning element 40.

In the vicinity of the free rim of the topside of the upper counter-positioning element 56 a housing locking web 58 is arranged. The housing locking web 58 is positioned, when the housing cover 26 is mounted, on the side of the upper counter positioning element 56 facing away from the lower counter positioning element 48. The housing locking web 48 extends parallel to the pivot axis 37 across the entire width of the upper counter-positioning element 56. It is beveled on its free side.

The size of the topside of the upper counter-positioning element 56 perpendicular to the assembly direction 28 and perpendicular to the pivot axis 37 is somewhat greater than the size of the surface of the upper positioning element 40 that is facing the lower positioning element 38 in a direction perpendicular to the latching element 30. In the closed state of the latching element 30, the housing locking web 58 locks behind the upper positioning element 40 that serves thus as an element locking section.

When producing the air filter 14, first the housing bottom part 10 with the latching elements 30 is manufactured. Moreover, the filter element 18 with the sealing rim 28 and the housing cover 26 are produced separately.

The filter element 18 is inserted in the assembly direction 28 into the housing bottom part 10 so that the sealing rim 20 is resting flat on the sealing surface 22 of the housing bottom part.

The housing cover 26, with its open side leading, is placed in assembly direction 28 onto the housing bottom part 10 so that the sealing surface 24 of the housing cover rests flat on the sealing rim 28. The sealing rim 28 is now arranged between the sealing surface 24 of the housing cover and the sealing surface 22 of the housing bottom part.

Subsequently, the latching elements 30 are pivoted in the pivot direction, indicated in FIGS. 2 to 4 by arrows 60, about the respective pivot axis 37 toward the housing cover 26. This can be done in an automated process by an appropriate assembly device. In FIG. 4, one of the latching elements 30 is illustrated in an exemplary position of the pivot movement before the final closed state is reached; the final closed state is shown in FIG. 5.

During the pivot process, the locking web 44 of the guide pin 42 glides across the bottom side of the lower counter-positioning element 48 and engages the guide slot 52. In the closed state, the locking web 44 is locked in the locking groove 54. Moreover, the upper positioning element 40 glides across the housing locking web 58 of the upper counter-positioning element 56 and locks finally behind it.

The beveled free ends of the locking web 44 and of the housing locking web 58, of the guide pin 42, and of the guide slot 52 serve as guiding aids when pivoting the latching element 30 into the locked position.

A defined locked connection between the housing cover 26 and the housing bottom part 10 is produced. It is achieved that the sealing tongue 22 of the sealing element 20 is positioned precisely in a receiving space 62 of the housing bottom part 10 and is clamped seal-tightly in radial direction between a sealing web 64 of the housing cover 26 and a sealing web 66 of the housing bottom part 10 so that the connection prevents air leaks.

Upon pivoting of the latching element 30 into the closed state, the upper counter positioning element 56 and the lower counter positioning element 48 are clamped between the upper positioning element 48 and the lower positioning element 38 and are forced against each other. The sealing rim 20 is compressed in the assembly direction 28. The film hinges 36 are subjected to mechanical tension. Upon a later attempt to pivot the latching element 30 in a direction opposite to the pivot direction 60, the mechanical tension causes the film hinges 36 to break at their predetermined breaking points 39.

The locking web 44 is also provided with a predetermined breaking point so that it will break when pulling out the latching element 30. The latching element 30 cannot be reused. Upon pulling out the latching element 30, the guide slot 52 prevents that the guide pin 42, for example, by rotating or tilting, can be pulled out without the locking web 44 breaking.

Figure 6:
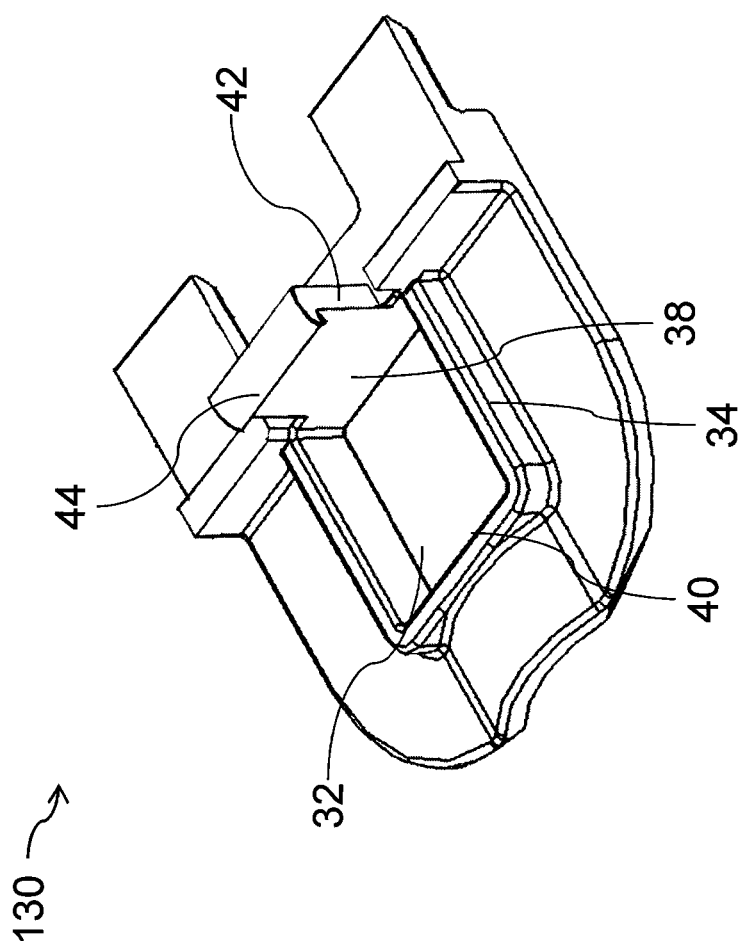
FIG. 6 is an isometric illustration of a replacement latching element which after removal of the original latching element of FIGS. 1 through 5 can be used for closing the air filter housing.

When the air filter housing 12 is opened, for example, for exchanging the filter element 18, the latching elements 30 must be removed; this causes the film hinges 36 to break at their predetermined breaking points 39. In order to be able to close the air filter housing 12 again, replacement latching elements 130 are required; one is illustrated in an exemplary fashion in FIG. 6. The replacement latching element 130 differs from the original latching elements 30 of FIGS. 1 through 5 in that they are separate components and have no film hinges 36. For mounting, the latching element 130 is simply placed with the positioning opening 32 onto the upper counter positioning element 56 and the lower counter positioning element 48 wherein the guide pin 42, in analogy to mounting of the original latching element 30, is inserted into the guide slot 52. Removal of the replacement latching element 130 is realized in the same way as in connection with the latching element 30; this also causes the locking webs 44 to break in order to prevent multiple reuse of the replacement latching element 130.

In all above described embodiments of an air filter housing 12 and a latching element 30; 130, the following modifications are conceivable inter-alia.

The invention is not limited to an air filter housing 12 of an internal combustion engine. Instead, it can also be used in connection with other types of air filter housings, for example, in air conditioning devices. Also, it can be used outside of the automotive field, for example, in industrial motors.

The housing bottom part 10 and the latching element 30 can be made of different materials. The latching element 30, for example, can be connected by means of injection molding through the film hinges 36 with the housing bottom part 10. The housing bottom part 10 and/or the latching element 30; 130 can be made of glass fiber-reinforced plastic material.

The latching element 30 can be connected with the film hinges 36 also to the housing cover 26 instead of being connected to the housing bottom part 10.

The guide slot 52 can be arranged on the housing cover 26 instead of being arranged on the housing bottom part 10. The guide pin 42 in this case is arranged at a different location on the latching element 30; 130.

It is also possible to provide more or fewer than four latching elements 30; 130 for holding together the housing part 10 and the housing cover 26.

The invention can also be used in air filter housings in which the housing cover 26 is not mounted exclusively by means of a straight movement in the assembly direction 28 on the housing bottom part 10. The housing cover can also be pivoted by means of a pivot movement onto the housing bottom part so that the end phase of the pivot movement is realized in the assembly direction 28.

Instead of the sealing rim 20 in the form of an axial seal, it is also possible to have a different type of seal, for example, a radial seal can be used.

The positioning opening 32 can also be shaped differently, for example, round or oval, instead of being rectangular.

Instead of breaking off when opening the latching element 30, the predetermined breaking points 39 of the film hinges 36 can also break already during the closing step.

The air filter housing 12 can be arranged spatially differently than illustrated in FIGS. 1 to 5. For example, the housing cover 26 can also be arranged below the housing bottom part 10.

The invention, instead of being used in connection with radially acting sealing element 20, can also be used in connection with axially acting seals.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter housing of an air filter, the filter housing having a raw air inlet and a clean air outlet, wherein a filter element is insertable into the filter housing such that the raw air inlet is seal-tightly separated from the clean air outlet; the filter housing comprising:
   a first housing part and a second housing part openable connected to each other;
   at least one latching element securing said first and second housing parts relative to each other in a closed state of said at least one latching element;
   said at least one latching element connected to said first housing part by a moveable connection at least up to the point of first assembly of said first and second housing parts;
   said at least one latching element pivotable by said moveable connection in a pivot movement into said closed state for latching said first and second housing parts;
   wherein said first housing part is formed monolithically together with said latching element, said latching element being unitary one-piece with said first housing part;

wherein said at least one latching element has a positioning opening having oppositely positioned boundary walls that form
- a lower positioning element formed on a first one of said oppositely positioned boundary walls;
- an upper positioning element formed on a second one of said oppositely positioned boundary walls;

said first and second housing parts each having a counter-positioning element, wherein said counter-positioning elements are projections on said first and second housing parts;

wherein, in said closed state, each of said counter positioning element projections project into said positioning opening and rest against a respective one of said positioning elements of said at least one latching element;

wherein, in said closed state, said counter-positioning elements are arranged between said at least two positioning elements of said at least one latching element, when viewed axially in an axial assembly direction of said first and second housing parts;

wherein said positioning elements of said at least one latching element each form a stop in said assembly direction for one of said counter-positioning elements, the stops preventing the first and second housing parts from separating more than spacing between the lower positioning element and the upper positioning element;

wherein said moveable connection has a predetermined breaking point;

wherein said moveable connection is a film hinge formed into said first housing part, said film hinge forming said predetermined breaking point;

wherein said at least one latching element has at least one element locking section that, in said closed state, locks at a housing locking section provided on said first housing part or said second housing part;

wherein said predetermined breaking point is when said at least one latching element is locked and/or released from said closed state is subjected to a mechanical stress such that at least upon release of said at least one latching element said predetermined breaking point breaks, eliminating said moveable connection.

2. The filter housing according to claim 1, wherein
said at least one element locking section is provided on one of said positioning elements of said at least one latching element and
wherein said housing locking element is provided on one of said counter positioning elements.

3. The filter housing according to claim 1, wherein
said at least one latching element has at least one element guide section and said first housing section or said second housing section has a housing guide section, wherein said at least one element guide section and said housing guide section interact with each other to guide said at least one latching element during said pivot movement into said closed state.

4. The filter housing according to claim 3, wherein
said at least one element guide section is a guide pin and said housing guide section is a guide slot.

5. The filter housing according to claim 3, wherein
said at least one element guide section comprises said at least one element locking section and said housing guide section comprises said housing locking element.

6. The filter housing according to claim 5, wherein
said at least one element locking section has a predetermined breaking point that breaks when separating said at least one element guide section from said housing guide section.

7. A latching element of a filter housing of an air filter according to claim 1, for securing a first housing part and a second housing part of the filter housing to each other that are connected to each other to be openable, wherein
the filter housing has a raw air inlet and a clean air outlet,
wherein a filter element is insertable into the filter housing such that the raw air inlet is seal-tightly separated from the clean air outlet; the latching element comprising:
- a positioning opening having oppositely positioned boundary walls that form
  - a lower positioning element formed on a first one of said oppositely positioned boundary walls;
  - an upper positioning element formed on a second one of said oppositely positioned boundary walls;
- two spaced apart legs;
- a flat guide pin arranged between and connected at opposing ends to said to spaced apart legs;
- wherein said flat guide pin extends perpendicularly outwardly away from said latching element;
- a locking web formed on an outwardly end of said flat guide pin, the locking web being hooked shaped and extending from said flat guide pin in a direction towards the positioning opening;
- wherein the positioning elements between which in a closed state of the latching element two counter positioning elements provided on the first and second housing parts are arranged, when viewed axially in an axial assembly direction of the first and second housing parts,
- wherein said at least two positioning elements each form a stop in said assembly direction for one of the counter positioning elements; at least one element locking section that, in said closed state, locks at a housing locking section provided on the first housing part or the second housing part.

* * * * *